United States Patent
Stiehler et al.

(10) Patent No.: US 9,765,625 B2
(45) Date of Patent: Sep. 19, 2017

(54) TURBOMACHINE BLADE

(71) Applicant: MTU Aero Engines AG, Munich (DE)

(72) Inventors: Frank Stiehler, Bad Liebenwerda (DE); Andreas Hartung, Munich (DE)

(73) Assignee: MTU Aero Engines AG, Munich (DE)

( * ) Notice: Subject to any disclaimer, the term of this patent is extended or adjusted under 35 U.S.C. 154(b) by 612 days.

(21) Appl. No.: 14/283,985

(22) Filed: May 21, 2014

(65) Prior Publication Data

US 2014/0348657 A1 Nov. 27, 2014

(30) Foreign Application Priority Data

May 23, 2013 (EP) .................................... 13002703
May 23, 2013 (EP) .................................... 13002704

(51) Int. Cl.
| | |
|---|---|
| *F01D 5/10* | (2006.01) |
| *F01D 5/14* | (2006.01) |
| *F01D 5/18* | (2006.01) |
| *F01D 5/22* | (2006.01) |
| *F01D 5/24* | (2006.01) |
| *F01D 5/26* | (2006.01) |
| *F01D 9/02* | (2006.01) |
| *F01D 25/06* | (2006.01) |

(52) U.S. Cl.
CPC ................. *F01D 5/10* (2013.01); *F01D 5/14* (2013.01); *F01D 5/18* (2013.01); *F01D 5/22* (2013.01); *F01D 5/225* (2013.01); *F01D 5/24* (2013.01); *F01D 5/26* (2013.01); *F01D 9/02* (2013.01); *F01D 25/06* (2013.01); *F05D 2260/96* (2013.01); *Y02T 50/671* (2013.01); *Y02T 50/676* (2013.01); *Y10T 29/49336* (2015.01)

(58) Field of Classification Search
CPC ..... F01D 5/26; F01D 5/18; F01D 5/22; F01D 5/225; F01D 5/24; F01D 5/14; F01D 9/02; F01D 25/06; Y02T 50/671; Y02T 50/676; Y02T 29/49336
USPC .......................................................... 416/500
See application file for complete search history.

(56) References Cited

U.S. PATENT DOCUMENTS

| | | | |
|---|---|---|---|
| 1,833,754 A | 11/1931 | Paget | |
| 2,310,412 A * | 2/1943 | Fianders | ................. F01D 5/225 416/190 |
| 2,349,187 A * | 5/1944 | Meyer | ....................... F01D 5/16 188/322.5 |
| 2,462,961 A * | 3/1949 | Harker | .................. B64C 11/008 188/266 |
| 2,646,920 A | 7/1953 | Butcher | |
| 2,651,494 A | 9/1953 | Persson | |

(Continued)

FOREIGN PATENT DOCUMENTS

| | | |
|---|---|---|
| DE | 102 02 995 | 8/2003 |
| DE | 10 2009 010 185 | 8/2010 |

(Continued)

*Primary Examiner* — Phutthiwat Wongwian
*Assistant Examiner* — Jason T Newton
(74) *Attorney, Agent, or Firm* — Davidson, Davidson & Kappel, LLC

(57) ABSTRACT

A blade (1) for a turbomachine, including an impact chamber (2), a single impulse body (3) being situated in the impact chamber, a clearance (S1+S2) between the impulse body and the impact chamber being at least 10 μm and/or at most 1.5 mm in at least one direction.

16 Claims, 7 Drawing Sheets

(56) References Cited

U.S. PATENT DOCUMENTS

| | | | | |
|---|---|---|---|---|
| 2,828,941 A * | 4/1958 | Foley | F01D 5/16 | 416/231 R |
| 2,862,686 A * | 12/1958 | Bartlett | F01D 5/16 | 416/213 R |
| 2,912,223 A * | 11/1959 | Hull, Jr. | F01D 5/22 | 416/221 |
| 2,920,868 A * | 1/1960 | Ackerman | F01D 5/282 | 416/229 A |
| 2,930,581 A * | 3/1960 | Klint | F01D 5/26 | 416/219 R |
| 2,990,156 A * | 6/1961 | Quayle | F01D 5/22 | 416/140 |
| 3,065,954 A * | 11/1962 | Whitaker | F01D 5/045 | 415/218.1 |
| 3,291,446 A * | 12/1966 | Huebner, Jr. | F01D 5/021 | 416/181 |
| 3,292,900 A * | 12/1966 | Pettersen | F01D 5/30 | 29/889.21 |
| 3,881,844 A * | 5/1975 | Hennessey | F01D 5/22 | 416/145 |
| 4,343,594 A * | 8/1982 | Perry | F01D 5/3015 | 416/193 A |
| 4,355,957 A * | 10/1982 | Sifford | F01D 5/26 | 416/145 |
| 4,441,859 A * | 4/1984 | Sadler | F01D 5/16 | 416/145 |
| 4,455,122 A * | 6/1984 | Schwarzmann | F01D 5/26 | 416/190 |
| 4,460,314 A * | 7/1984 | Fuller | F01D 5/26 | 416/145 |
| 4,480,959 A * | 11/1984 | Bourguignon | F01D 5/26 | 416/145 |
| 4,482,297 A * | 11/1984 | Mosimann | F01D 5/22 | 416/215 |
| 4,484,859 A * | 11/1984 | Pask | F01D 5/16 | 415/115 |
| 4,650,167 A * | 3/1987 | Steiner | F16F 7/108 | 188/380 |
| 4,936,749 A * | 6/1990 | Arrao | F01D 5/22 | 416/190 |
| 5,205,713 A * | 4/1993 | Szpunar | F01D 5/26 | 416/193 A |
| 5,232,344 A * | 8/1993 | El-Aini | F01D 5/16 | 416/145 |
| 5,498,137 A * | 3/1996 | El-Aini | F01D 5/16 | 416/144 |
| 5,558,497 A | 9/1996 | Kraft et al. | | |
| 5,599,170 A * | 2/1997 | Marchi | F01D 5/22 | 416/190 |
| 5,820,348 A * | 10/1998 | Fricke | F01D 5/027 | 188/268 |
| 5,924,845 A * | 7/1999 | Bagley | F01D 5/26 | 188/378 |
| 6,155,789 A * | 12/2000 | Mannava | C21D 10/005 | 29/889.1 |
| 6,827,551 B1* | 12/2004 | Duffy | F01D 5/16 | 415/119 |
| 7,125,225 B2 | 10/2006 | Surace et al. | | |
| 7,128,536 B2* | 10/2006 | Williams | F01D 5/16 | 416/229 R |
| 7,736,124 B2* | 6/2010 | Bauer | F01D 5/16 | 415/119 |
| 7,806,410 B2* | 10/2010 | El-Aini | F01D 11/02 | 277/413 |
| 7,955,054 B2* | 6/2011 | El-Aini | F01D 5/16 | 416/146 R |
| 8,105,039 B1* | 1/2012 | El-Aini | F01D 5/225 | 416/195 |
| 8,596,980 B2* | 12/2013 | Miller | F01D 5/225 | 416/190 |
| 8,790,086 B2* | 7/2014 | Honkomp | F01D 11/006 | 416/190 |
| 8,858,159 B2 | 10/2014 | Piggush et al. | | |
| 9,181,806 B2 | 11/2015 | Propheter-Hinckley | | |
| 9,249,668 B2* | 2/2016 | Fisk | F01D 5/16 | |
| 9,371,733 B2* | 6/2016 | Hartung | F01D 5/16 | |
| 2008/0145234 A1 | 6/2008 | Lee et al. | | |
| 2010/0034657 A1* | 2/2010 | Hunt | F01D 5/22 | 416/190 |
| 2011/0070085 A1* | 3/2011 | El-Aini | F01D 5/16 | 416/145 |
| 2011/0262274 A1* | 10/2011 | Boy | F01D 5/26 | 416/174 |
| 2013/0280083 A1 | 10/2013 | Hartung | | |
| 2013/0294913 A1* | 11/2013 | Campbell | F01D 5/16 | 416/145 |
| 2014/0348639 A1* | 11/2014 | Stiehler | F01D 5/18 | 415/119 |
| 2016/0146041 A1* | 5/2016 | Hartung | F01D 5/10 | 415/119 |
| 2016/0215651 A1* | 7/2016 | Hartung | F01D 25/04 | |
| 2016/0326881 A1* | 11/2016 | Hartung | F01D 5/16 | |
| 2017/0044910 A1* | 2/2017 | Hartung | F01D 5/16 | |
| 2017/0067487 A1* | 3/2017 | Hartung | F01D 5/16 | |

FOREIGN PATENT DOCUMENTS

| | | |
|---|---|---|
| EP | 1980716 | 10/2008 |
| EP | 2 484 870 | 8/2012 |
| FR | 981599 | 5/1951 |
| FR | 1024218 | 3/1953 |
| FR | 2 522 364 | 9/1983 |
| GB | 2067675 | 7/1981 |

* cited by examiner

TURBOMACHINE BLADE

This claims the benefit of European Patent Applications EP 13002703.0, filed May 23, 2013 and EP 13 002 704.8, filed May 23, 2013, both of which are hereby incorporated by reference herein.

The present invention relates to a blade for a turbomachine, to a turbomachine, in particular a gas turbine, in particular an aircraft engine gas turbine having a blade of this type, as well as to a method for manufacturing a blade of this type.

In particular, guide and moving blades of aircraft engine gas turbines may be aerofluid-dynamically, thermally and/or structure-mechanically excited to vibrations. In particular, self-excited vibrations may occur.

BACKGROUND

It is known from DE 10 2009 010 185 A1 to provide multiple damping bodies in a cavity in a turbine blade, which are able to move independently of each other relative to the walls of the cavity and relative to each other for the purpose of damping vibrations due to elastic impacts against each other and against the walls of the cavity.

SUMMARY OF THE INVENTION

It is an object of the present invention to provide an improved turbomachine.

The present invention provides a blade for a turbomachine includes an impact chamber, in particular exactly one, a single or multiple impact chamber(s), in each of which a single impulse body is situated, a clearance being provided between the impulse body and the impact chamber in at least one direction, which is at least 10 μm and/or at most 1.5 mm.

A novel vibration damping concept is based on this aspect. While blade vibrations have previously been damped by friction between friction bodies and friction surfaces of the blade or by multiple contacts between multiple bodies which require greater ranges of movement to increase entropy, this aspect uses minor individual impacts by an, in particular, stochastically or regularly repeating, oscillating impulse body in an impact chamber. To achieve a significant, vibration-damping effect, according to the present invention a well defined clearance range in the impact direction is required, since this is the only way for the desired effect to occur. Therefore, according to this aspect of the present invention, a lower limit of 10 μm and/or an upper limit of 1.5 mm is provided for the clearance, a clearance in the present case being understood to be, in particular, a freedom of movement or a gap. In one refinement, the clearance may be at least 0.05 mm, in particular at least 0.1 mm, in particular at least 0.5 mm. Additionally or alternatively, the clearance may be at most 1.2 mm, in particular at most 1.0 mm, in particular at most 0.8 mm.

A clearance or a gap between the impulse body and the impact chamber may be provided in all directions, in particular it may be the same size in all directions. For example, if the impulse body in one embodiment has a least essentially a spherical outer contour, an impact chamber in one embodiment has at least essentially a spherical inner contour having a larger diameter, the difference in diameters defines the clearance between the impulse body and the impact chamber, which is the same size in all directions.

Likewise, in one embodiment, one or multiple preferred impact directions may be defined by the impact chamber. For example, if the impulse body in one embodiment has at least essentially a circular cross section, the impact chamber in one embodiment has at least essentially a circular-cylindrical inner contour, in particular having at least essentially the same diameter, the longitudinal axis of the inner contour defines the clearance between the impulse body and the front sides of the impact chamber.

A preferred impact direction may generally be defined between one pair of opposite, in particular parallel, inner walls of the impact chamber, for example the front sides of a circular-cylindrical impact chamber. Likewise, the impact chamber in one embodiment may have an at least essentially cuboid design or be designed as an octahedron or another polyhedron having one or multiple pairs (for example, three pairs in the case of a cuboid) of opposite, in particular parallel, inner walls of the impact chamber, two opposite inner walls each defining one preferred impact direction between each other, and a clearance being provided between the impulse body and the impact chamber at least in one, in particular in all, preferred impact directions, which is at least 10 μm, in particular at least 0.05 mm, in particular at least 0.1 mm, in particular at least 0.5 mm and/or at most 1.5 mm, in particular at most 1.2 mm, in particular at most 1.0 mm, in particular at most 0.8 mm.

In one embodiment, one or multiple preferred impact directions is/are each situated in the direction of an, in particular first flexural, torsional or coupled vibrational eigenmode of the blade, in particular at least essentially in the direction and/or at the location of a maximum amplitude or deflection of this vibrational eigenmode. These vibrational eigenmodes, in particular, may be effectively damped thereby.

It has been found that this novel vibration-damping principle may be sensitive to the mass of the impulse body, due to individual impulse bodies having a greatly limited clearance. In one embodiment of the present invention, a lower limit of 10 mg and/or an upper limit of 1.5 g is therefore provided for the mass of the impulse body. In one refinement, the mass may be at least 0.03 g, in particular at least 0.1 g, in particular at least 0.5 g. Additionally or alternatively, the mass may be, in particular, at most 1.2 g, in particular at most 1.0 g, in particular at most 0.8 g.

In one embodiment, the impulse body is manufactured from an in particular high-temperature nickel or cobalt alloy suitable, in particular, for operating temperatures between 700° C. and 1,100° C. or an, in particular oxidic or non-oxidic ceramic.

As stated above, the impulse body may be provided with an at least essentially spherical design. In one embodiment, it may likewise be provided with a circular-cylindrical or disk-shaped design, in particular a circular disk-shaped design. In one embodiment, an outer contour of the impulse body is at least essentially congruent to an inner contour of the impact chamber, in particular in exactly one or exactly two or three cross sections or in all cross sections, which are, in particular, perpendicular to each other, it being possible to provide, in particular, the aforementioned clearance or a clearance fit therebetween in the particular cross section for the purpose of implementing an impact or a guided movement. For example, a spherical impulse body is congruent to a spherical impact chamber in all cross sections, a circular-cylindrical impulse body is congruent to a circular-cylindrical impact chamber in exactly one cross section perpendicular to its cylinder longitudinal axis, it being possible to provide a clearance fit in this cross section for the purpose of implementing a guided movement, while the clearance may be provided between the front sides. A circular disk-shaped impulse body in a cuboid impact chamber has a circular outer contour, for example in exactly one cross section, which is not congruent to the inner contour of the impact chamber, which is rectangular in this cross section. A clearance according to the present invention, and thus a preferred impact direction, may be defined between one or both pairs of opposite sides of this rectangular inner contour. The circular disk-shaped impulse body also has a rectangular outer contour in cross sections perpendicular to this cross section. A clearance according to the present invention may be defined in one or multiple of these cross sections. Likewise, a clearance fit may be provided, so that the impulse body is movably guided through the impact chamber in this cross section.

In one embodiment, an axis of symmetry of the impact chamber, and a preferred impact direction defined by the impact chamber, which has a blade longitudinal axis and a radial axis, form an angle which is between 0 degrees and 20 degrees.

An impact chamber may be situated, in particular, in an outer shroud, in particular in an outer shroud vane extending at least essentially radially, since high flexural and torsional amplitudes occur here. Additionally or alternatively, an impact chamber may be situated in an, in particular hollow, turbine blade, since sufficient installation space is available here, and higher flexural and torsional eigenmodes may be effectively influenced or controlled. Additionally or alternatively, an impact chamber may be situated in a blade root of the blade, since the latter is easily accessible and/or stable.

In one embodiment, an impact chamber may become or be closed by a cover which in one refinement may become or be detachably or permanently connected to the edge of the impact chamber or to the blade, in particular in a frictionally engaged, form-fitting or integral way, in particular glued, welded, soldered, screwed or caulked. In one refinement, the cover is flush with an outer contour of the blade, so that the closed impact chamber does not or only minimally disturbs the outer contour of the blade.

Likewise, an impact chamber may become or be closed by an adjacent blade, in particular by a front side of an adjacent shroud or blade root. In this way, the impact chamber may be closed by the adjacent blade during assembly.

Likewise, an impact chamber may become or be closed by a housing, a hub or a rotor of the turbomachine. If the impact chamber is designed to be radially open to the inside, for example, in a blade root of a moving blade or a shroud of a guide blade, it may become or be closed by the rotor to which the running blade is or becomes fastened, or by the hub to which the guide blade is or becomes fastened.

In one embodiment, the impact chamber, together with the blade, becomes or is primarily shaped, in particular casted. Likewise, the impact chamber may also become or be produced in the blade surface at a later point in time using a material removing method, in particular with the aid of drilling, milling, erosion or electrochemical machining.

In one embodiment, the impact chamber becomes or is defined by a calotte or a housing which is situated in a recess in the blade where, in one refinement, it may become or be fastened in an integral, frictionally engaged or form-fitting way, in particular glued, welded, soldered, screwed or caulked.

In one embodiment, the blade is a moving blade. Likewise, the blade may be a guide blade.

According to one aspect of the present invention, an impact chamber according to the present invention, including the impulse body, is provided in one or multiple guide blade(s) and/or moving blade(s) of one or multiple compressor stage(s) and/or turbine stage(s) of a gas turbine, in particular an aircraft engine gas turbine.

To manufacture a blade, according to one aspect of the present invention, the impact chamber is initially provided in the blade, the impulse body is then inserted into the impact chamber, and the impact chamber is subsequently closed.

BRIEF DESCRIPTION OF THE DRAWINGS

Other advantages and features are derived from the subclaims and the exemplary embodiments. In partially schematic form:

DETAILED DESCRIPTION

Figure 1A:
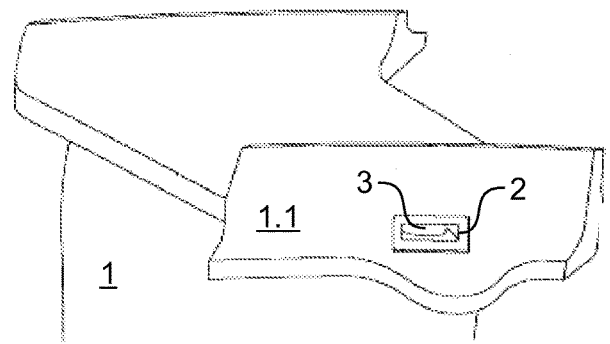
FIG. 1A shows a shroud area of a blade of a gas turbine according to one embodiment of the present invention, having an opened impact chamber.
Figure 1B:
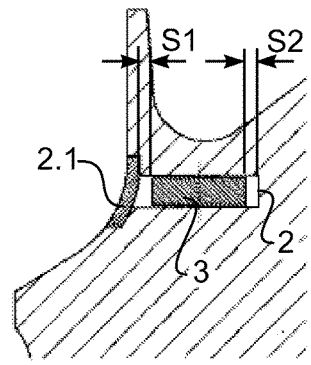
FIG. 1B shows an enlarged section of the impact chamber area from FIG. 1A.

FIG. 1 shows an outer shroud area of a blade 1 of a gas turbine according to one embodiment of the present invention, including an outer shroud vane having an opened impact chamber, in which a circular disk-shaped impulse body 3 is accommodated. In the operating state of the blade, the impact chamber is closed by a cover 2.1, which is apparent in the enlarged section of the impact chamber area in FIG. 1B, but which is omitted in FIG. 1A.

The impact chamber has an at least essentially cuboid inner contour, which may be primarily shaped or produced using a material removing method, for example milling, for example during casting of the blade. In the section in FIG. 1B, the circular disk-shaped impulse body has a cuboid outer contour. In the section in FIG. 1B, a clearance S1+S2, which is between 10 μm and 1.5 mm, is provided between the outer contour and the parallel side walls. This preferred impact direction is oriented in the direction of a vibrational eigenmode of the blade. In a vertical section perpendicular to the image plane of FIG. 1B, the circular disk-shaped impulse body also has a cuboid outer contour. In this section, in an embodiment in the horizontal direction, a clearance, which is between 10 μm and 1.5 mm, is also provided between the outer contour and the parallel side walls, so that the impulse body has a horizontal degree of freedom in both sections. In another embodiment, however, in the vertical section perpendicular to the image plane of FIG. 1B, a clearance fit is provided in the horizontal direction, which guides the impulse body exclusively in the horizontal preferred impact direction in FIG. 1B. In a horizontal section perpendicular to the image plane of FIG. 1B, the impulse body has a circular disk-shaped outer contour. A clearance fit, which guides the impulse body exclusively in the horizontal direction in FIG. 1B, is provided between the two front sides of the circular disk-shaped impulse body and the sides of the cuboid impact chamber opposite thereto.

The mass of the impulse body manufactured from a nickel or cobalt alloy or ceramic, may be between 10 mg and at most 1.5 g.

After the impact chamber has been provided in the blade and the impulse body has been inserted into this impact chamber, the impact chamber is closed by cover 2.1, which is flush with the outer contour of the blade, as is apparent in FIG. 1B.

During operation, impulse body 3 carries out impacts in the preferred impact directions defined by impact chamber 2, which are determined in this/these direction(s) by the clearance between the impulse body and the impact chamber and which damp blade vibration in a novel way.

Figure 2A:
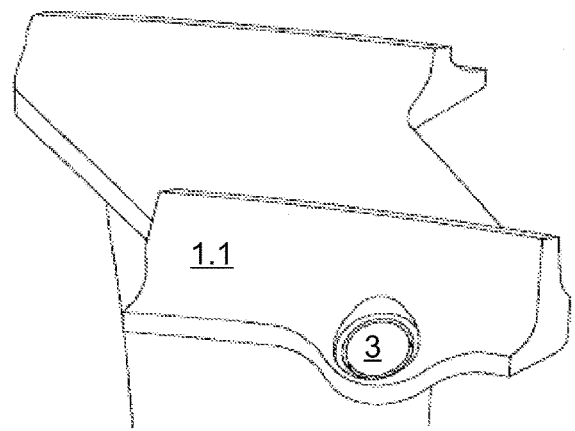
FIG. 2A shows a shroud area of a blade of a gas turbine according to another embodiment of the present invention, having an opened impact chamber.
Figure 2B:
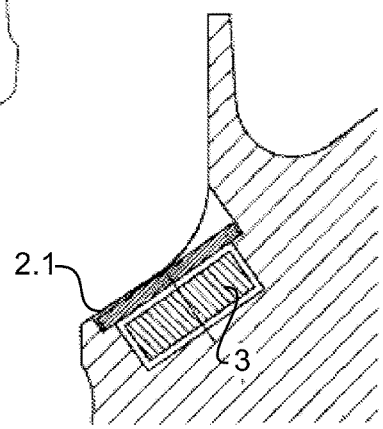
FIG. 2B shows an enlarged section of the impact chamber area from FIG. 2A.

FIGS. 2A and 2B show a blade in a way corresponding to FIGS. 1A and 1B according to another embodiment of the present invention. Corresponding elements are identified by the same reference numerals, so that reference is hereby made to the preceding description and only the differences are discussed below.

In the embodiment in FIG. 2, circular disk-shaped impulse body 3 is inserted into the impact chamber not in its radial direction but in its axial direction (upper left to the lower right in FIG. 1B), the latter subsequently being closed by cover 2.1.

Figure 3A:
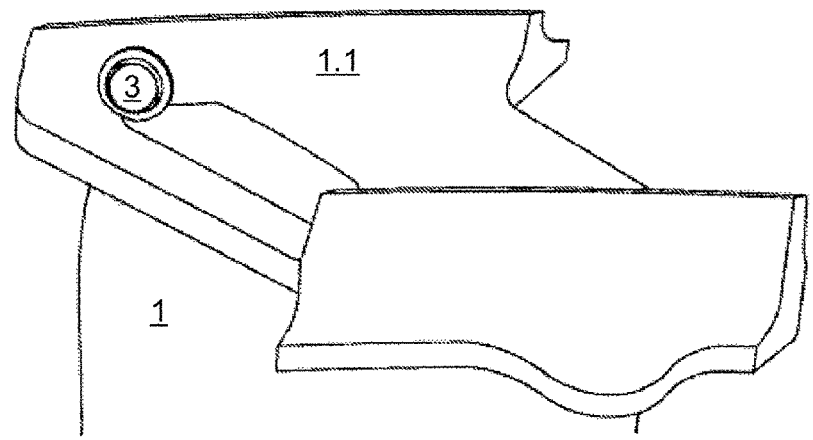
FIG. 3A shows a shroud area of a blade of a gas turbine according to another embodiment of the present invention, having an opened impact chamber.
Figure 3B:
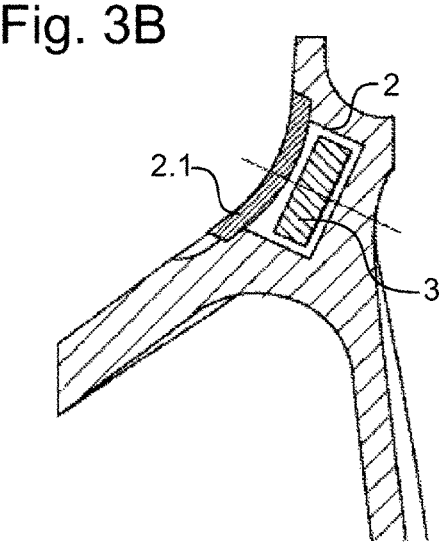
FIG. 3B shows an enlarged section of the impact chamber area from FIG. 3A.

FIGS. 3A and 3B show a blade in a way corresponding to FIGS. 1 and 2 according to another embodiment of the present invention. Corresponding elements are identified by the same reference numerals, so that reference is hereby made to the preceding description and only the differences are discussed below.

In the embodiment in FIG. 3, the impulse body and the impulse chamber are situated on the axially inner side of outer shroud vane 1.1.

Figure 4A:
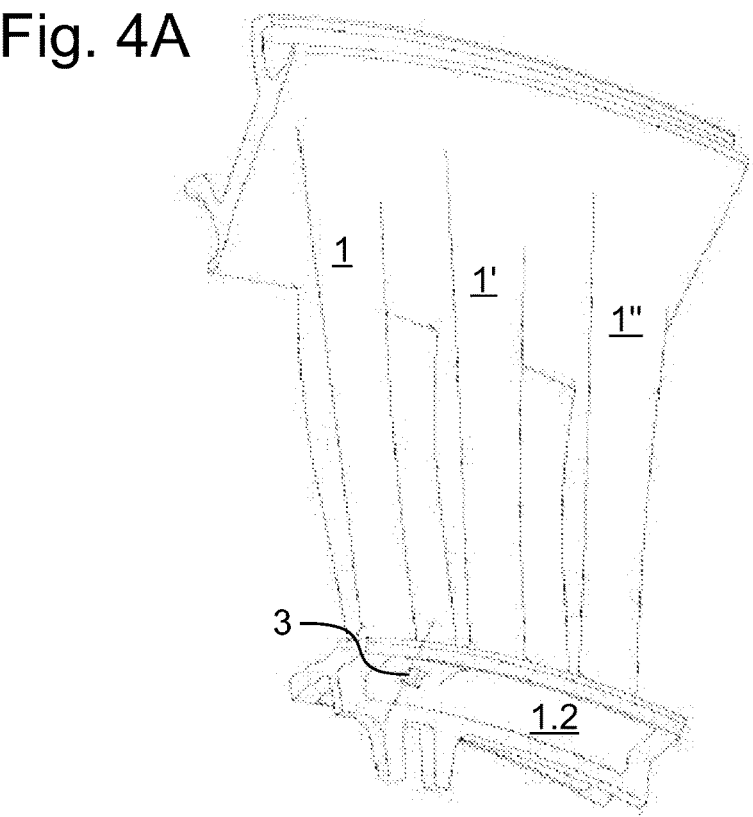
FIG. 4A shows a perspective view of a blade of a gas turbine according to another embodiment of the present invention, having an opened impact chamber.
Figure 4B:
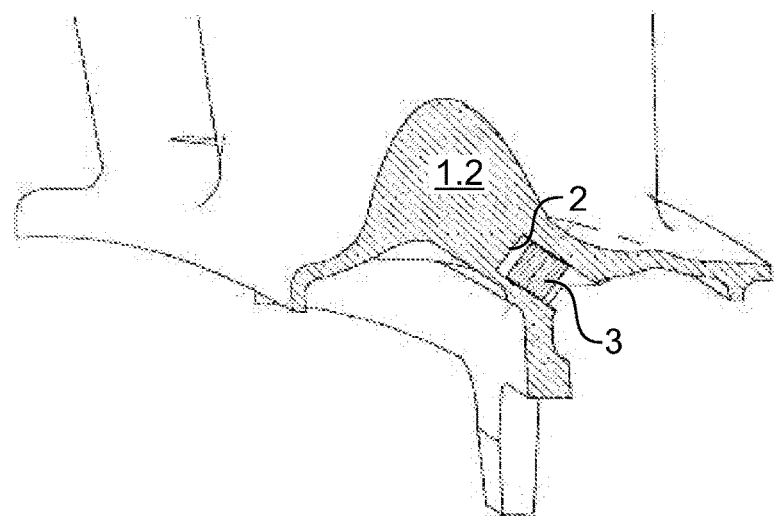
FIG. 4B shows an enlarged section of the impact chamber area from FIG. 4A.

FIG. 4B shows an enlarged section of the impact chamber area of a blade in a way corresponding to FIGS. 1B, 2B and 3B according to another embodiment of the present invention, which is illustrated in a perspective view in FIG. 4A. Corresponding elements are identified by the same reference numerals, so that reference is hereby made to the preceding description and only the differences are discussed below.

In the embodiment in FIG. 4, impact chamber 2 and impulse body 3 are situated in a blade root 1.2, with the aid of which not only blade 1 but also two additional blades 1', 1" are integrally provided.

Figure 5A:
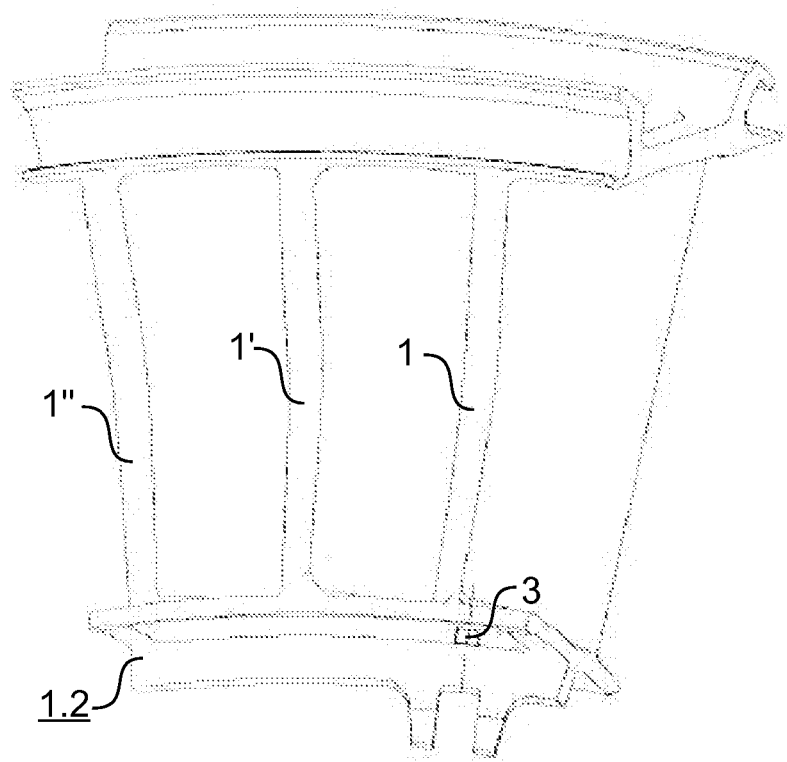
FIG. 5A shows a perspective view of a blade of a gas turbine according to another embodiment of the present invention, having an opened impact chamber.
Figure 5B:
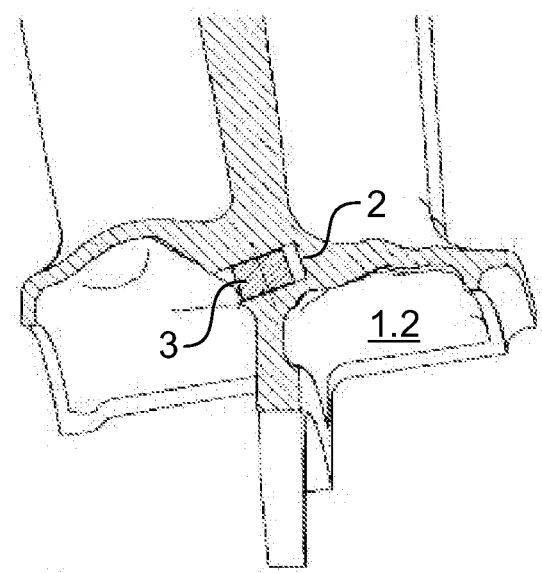
FIG. 5B shows an enlarged section of the impact chamber area from FIG. 5A.

The impact chamber is closed by the rotor or the hub of the turbomachine (not illustrated) during assembly. FIGS. 5A and 5B show a blade in a way corresponding to FIG. 4 according to another embodiment of the present invention. Corresponding elements are identified by the same reference numerals, so that reference is hereby made to the preceding description and only the differences are discussed below.

In the embodiment in FIG. 5, the impulse body and the impulse chamber are situated on the opposite side of blade root 1.2. The impact chamber may generally be situated on an inlet or outlet side of a blade root.

Figure 6A:
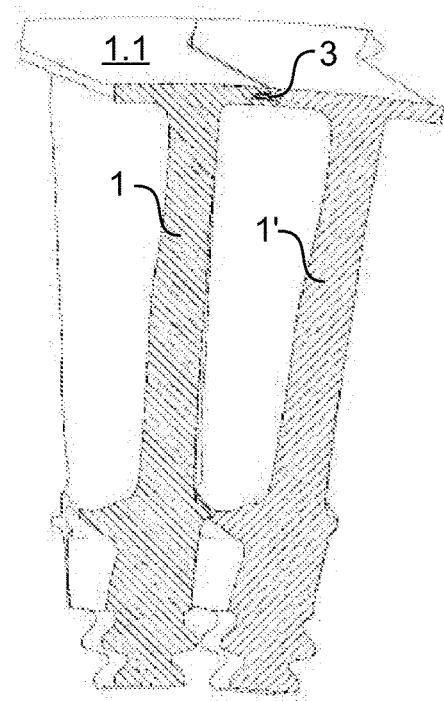
FIG. 6A shows a section of a blade of a gas turbine according to another embodiment of the present invention and an adjacent blade.
Figure 6B:
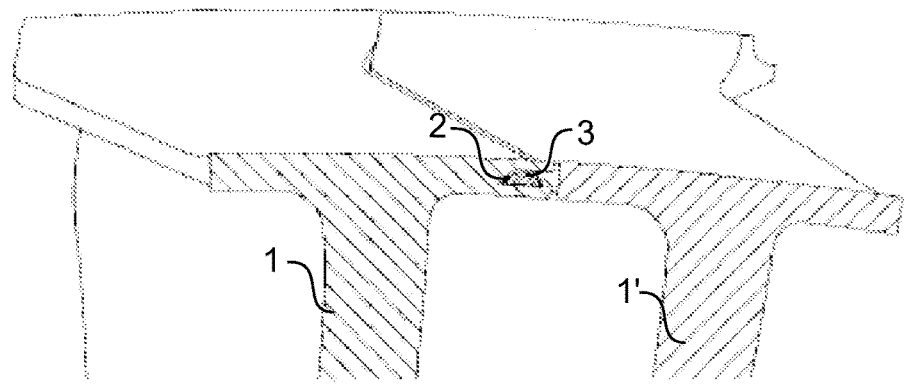
FIG. 6B shows an enlarged section of the shroud area of the two adjacent blades from FIG. 6A.

FIG. 6B shows an enlarged section of the impact chamber area of a blade in a way corresponding to FIGS. 1B, 2B, 3B, 4B and 5B according to another embodiment of the present invention, which is illustrated in a sectional view in FIG. 6A. Corresponding elements are identified by the same reference numerals, so that reference is hereby made to the preceding description and only the differences are discussed below.

In the embodiment in FIG. 6, the impact chamber is not closed by a cover but by an adjacent blade 1' during assembly.

Figure 7A:
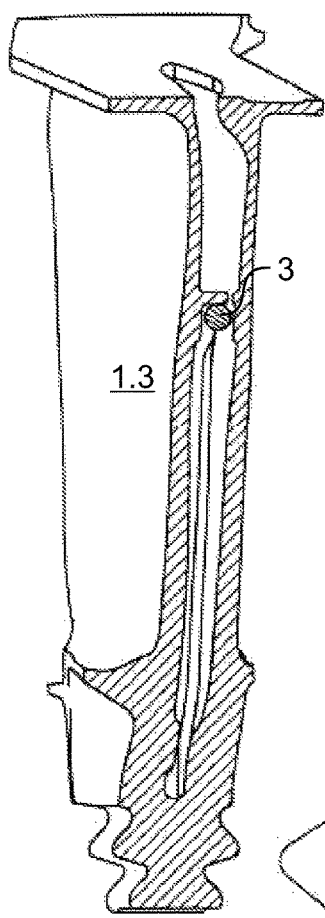
FIG. 7A shows a section of a hollow blade of a gas turbine according to another embodiment of the present invention.
Figure 7B:
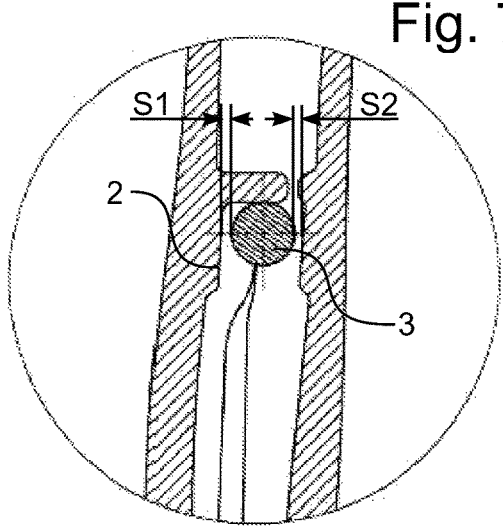
FIG. 7B shows an enlarged detail from FIG. 7A.
Figure 7C:
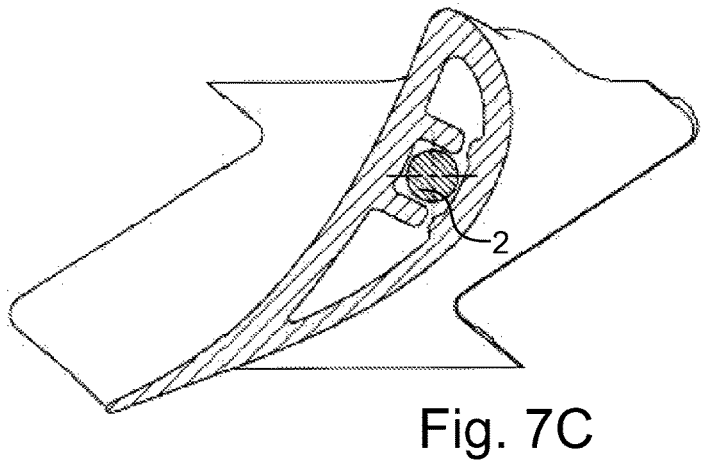
FIG. 7C shows a cross section of the impact chamber area from FIG. 7B.

FIG. 7A shows a section of a blade in a way corresponding to FIG. 6A according to another embodiment of the present invention; FIG. 7B shows an enlarged detail of the impact chamber area in this FIG. 7A; FIG. 7C shows a cross section of this impact chamber area in FIG. 7B.

Blade 1 in FIG. 7 is a hollow blade which includes a turbine blade 1.3 having a cooling channel, in which impact chamber 2 is primarily shaped. During operation, a spherical impulse body 3 is driven by gyroscopic forces into one-sidedly open impact chamber 2, in which it has a clearance S1+S2 in the horizontal direction in FIG. 7B, which is between 10 μm and 1.5 mm.

Figure 8:
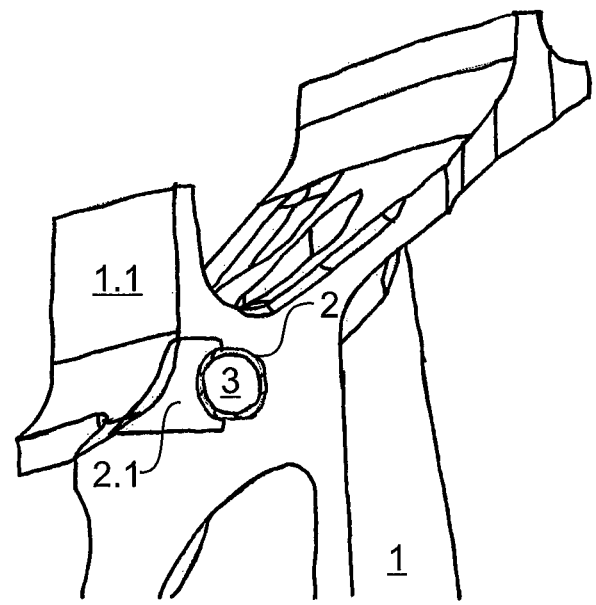
FIG. 8 shows a perspective partial section of a shroud area of a blade of a gas turbine according to another embodiment of the present invention.

FIG. 8 shows a blade in a way similar to FIGS. 1 and 3 according to another embodiment of the present invention. Corresponding elements are identified by the same reference numerals, so that reference is hereby made to the preceding description and only the differences are discussed below.

In the embodiment in FIG. 8, impulse body 3 in impact chamber 2 in outer shroud vane 1.1 of blade 1 has a spherical design, the impact chamber being closed by a cover 2.1.

Figure 9:
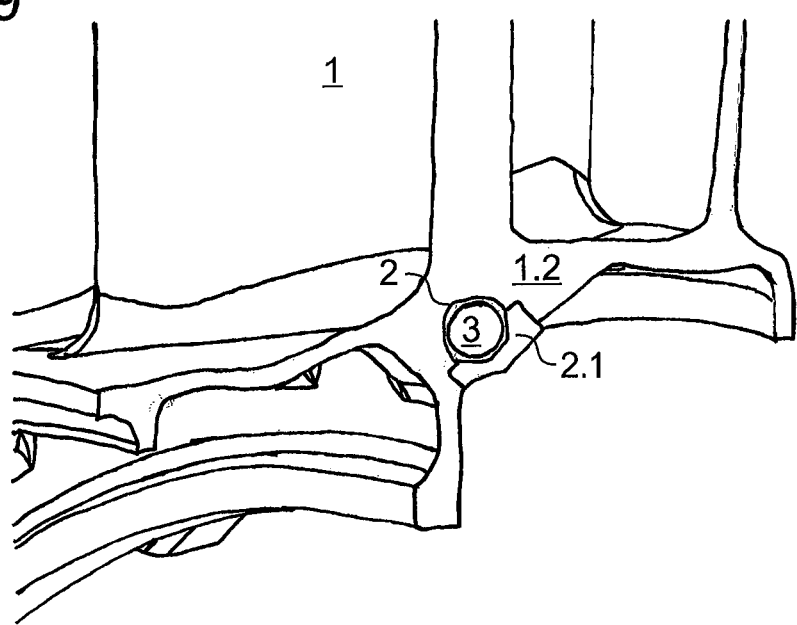
FIG. 9 shows a perspective partial section of a blade root area of a blade of a gas turbine according to another embodiment of the present invention.

FIG. 9 shows a blade in a way similar to FIGS. 4 and 5 according to another embodiment of the present invention. Corresponding elements are identified by the same reference numerals, so that reference is hereby made to the preceding description and only the differences are discussed below.

In the embodiment in FIG. 9, impulse body 3 in impact chamber 2 in blade root 1.2 of blade 1 also has a spherical design. Impact chamber 2 is also closed by a cover 2.1.

LIST OF REFERENCE NUMERALS

1, 1',
1" Blade
1.1 Outer shroud vane
1.2 Blade root
1.3 Turbine blade
2 Impact chamber
2.1 Cover
3 Impulse body
S1+S2 Clearance

What is claimed is:

1. A blade for a turbomachine, comprising:
an impact chamber; and
a single impulse body movably situated in the impact chamber, a clearance between the impulse body and the impact chamber in all directions being at least 0.1 mm and at most 1.5 mm and wherein a mass of the impulse body is at least 10 mg and at most 1.5 g.

2. The blade as recited in claim 1 wherein the impulse body is provided with a spherical or disk shaped design.

3. The blade as recited in claim 1 wherein the impulse body is made from a nickel or cobalt alloy or a ceramic.

4. The blade as recited in claim 1 wherein the impact chamber has at least one pair of opposite, inner walls, each wall defining a preferred impact direction.

5. The blade as recited in claim 4 wherein the opposing inner walls are parallel.

6. The blade as recited in claim 1 wherein the impact chamber is situated in an outer shroud or a blade root of the blade.

7. The blade as recited in claim 1 wherein the impact chamber is situated in an outer shroud, the outer shroud vane extending radially.

8. The blade as recited in claim 1 wherein the impact chamber is closed by a cover.

9. The blade as recited in claim 8 wherein the cover is flush with an outer contour of the blade.

10. The blade as recited in claim 1 wherein the impact chamber, together with the blade, is formed in the blade surface using a material removing method or defined by a calotte situated in a recess in the blade.

11. The blade as recited in claim 1 wherein the blade is a moving blade.

12. The blade as recited in claim 1 wherein the blade is a guide blade.

13. A turbomachine comprising at least one compressor stage and/or turbine stage having at least one blade, the blade comprising:
an impact chamber; and
a single impulse body movably situated in the impact chamber, a clearance between the impulse body and the impact chamber in ail directions being at least 0.1 mm and at most 1.5 mm and wherein a mass of the impulse body is at least 10 mg and at most 1.5 g.

14. A gas turbine comprising the turbomachine as recited in claim 13.

15. An aircraft engine gas turbine comprising the gas turbine as recited in claim 14.

16. A method for manufacturing a blade as recited in claim 1, the method comprising: providing the impact chamber in the blade; inserting the impulse body into the impact chamber; and subsequently closing the impact chamber.

* * * * *